March 1, 1927.  1,619,786.
S. E. ANDERSON
LOADER ATTACHMENT FOR TRACTORS
Filed May 24, 1926 3 Sheets-Sheet 1
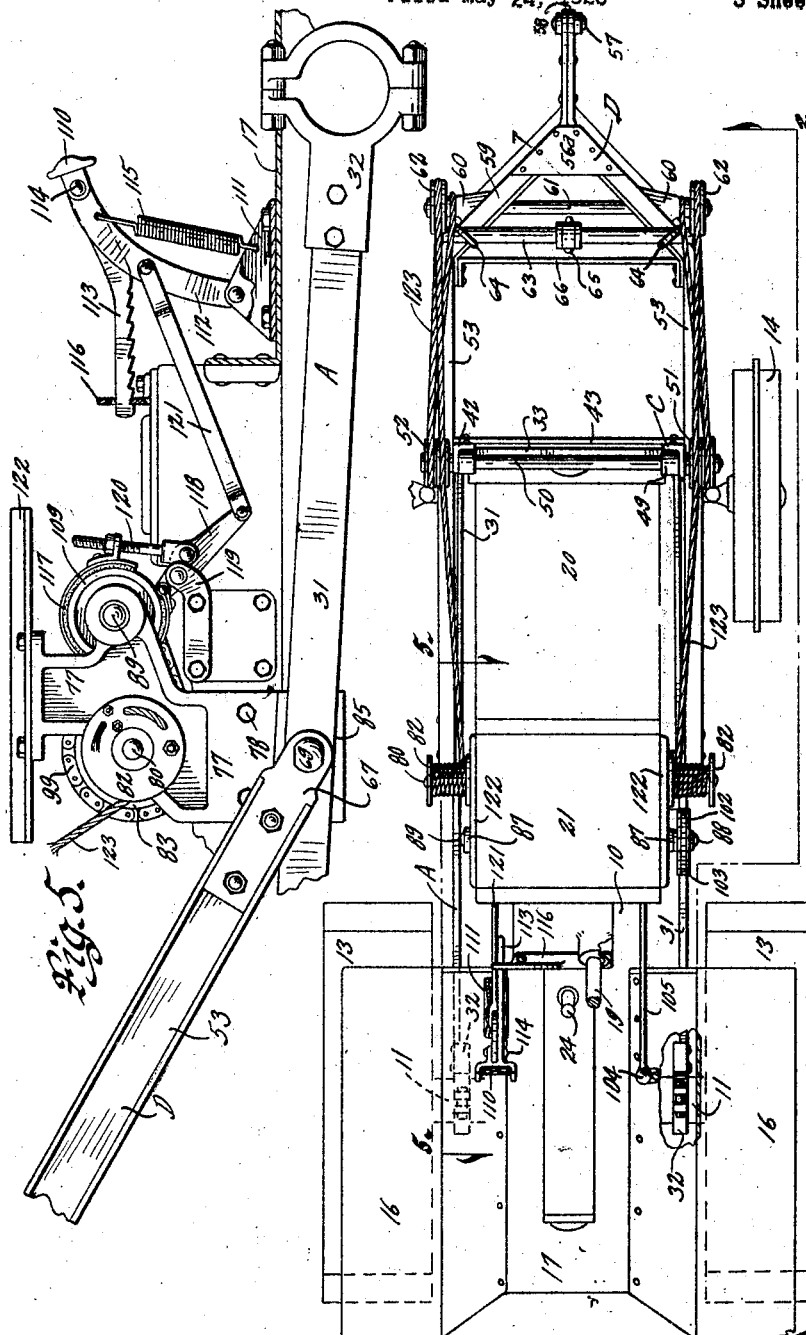
Witness
Ray Fisher
Inventor
Sigurd E. Anderson
by Bair & Freeman, Attorneys

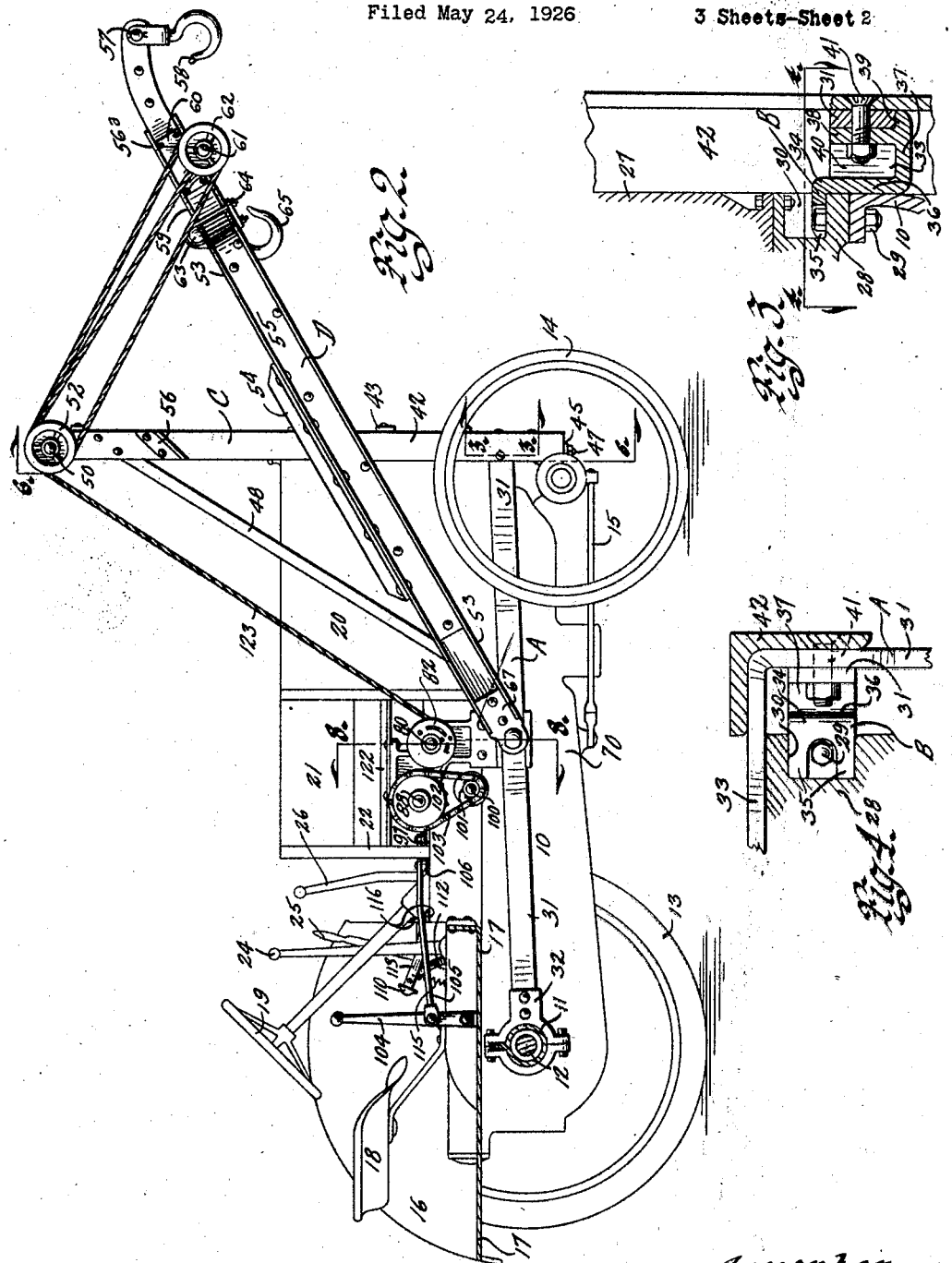

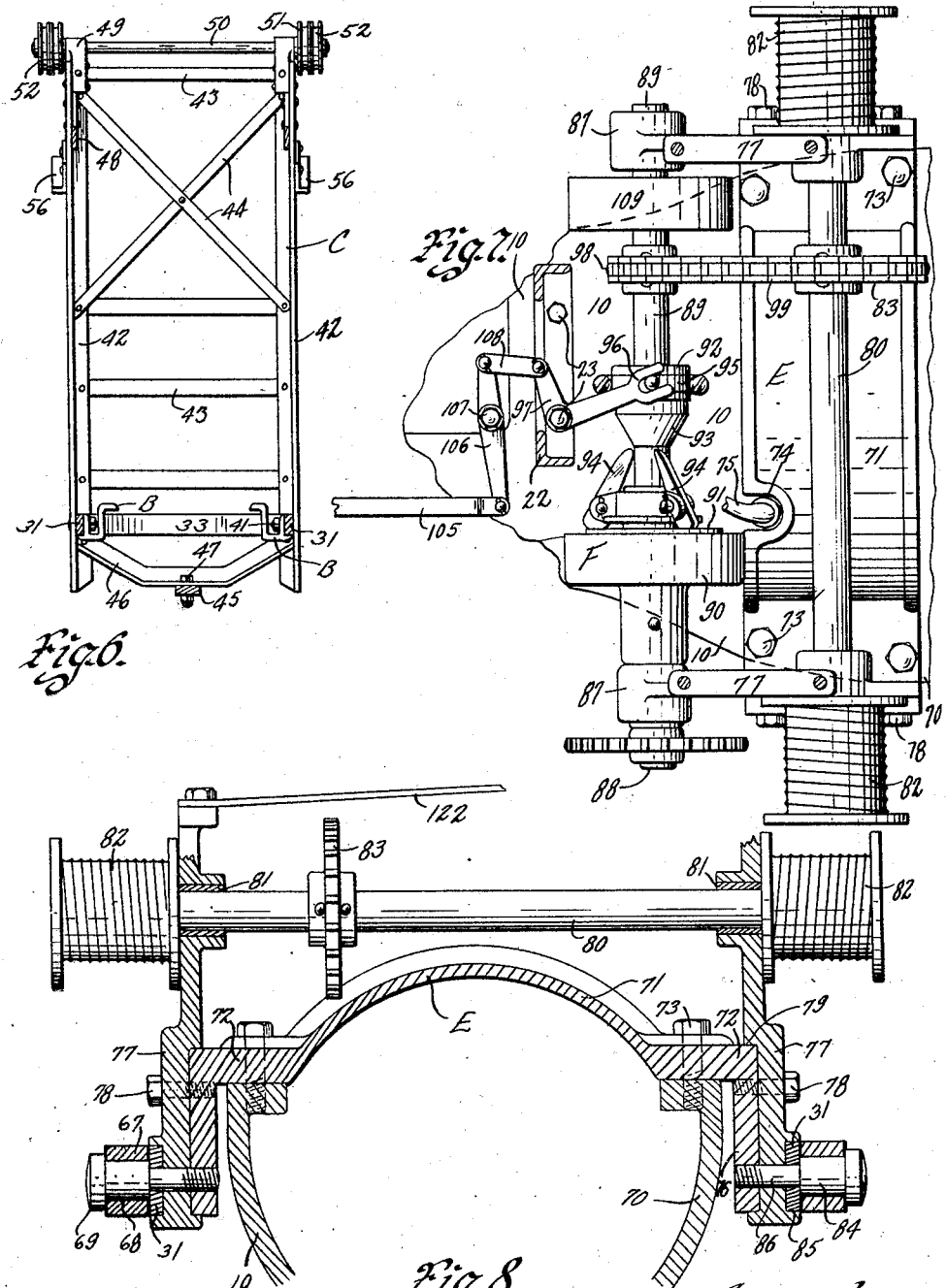

Patented Mar. 1, 1927.

1,619,786

UNITED STATES PATENT OFFICE.

SIGURD E. ANDERSON, OF DES MOINES, IOWA, ASSIGNOR TO NEW MONARCH MACHINE & STAMPING COMPANY, OF DES MOINES, IOWA.

LOADER ATTACHMENT FOR TRACTORS.

Application filed May 24, 1926. Serial No. 111,265.

The object of my invention is to provide an attachment for tractors of simple, durable and comparatively inexpensive construction.

More particularly it is my object to provide an attachment frame adapted to be secured to a tractor of the McCormick-Deering type which frame co-operates with standard parts of the tractor and secured thereto for rigidly anchoring the frame to the tractor.

Still a further object is to provide a U-shaped frame adapted to receive the tractor between its sides and having its free ends secured to the rear axle housing of the tractor and having its connecting member positioned just forwardly of the front end or radiator of the tractor itself and to have the legs of the U-shaped frame between their ends connected together by a saddle adapted to rest upon a portion of the tractor engine itself.

Still a further object is to provide means for supporting the forward end of the attachment frame to the tractor, employing standard parts of the tractor itself for conveniently anchoring and supporting the frame thereon.

Still a further object is to provide a fitting adapted to project into an opening formed in the radiator frame and to be secured to the forward part of the attachment frame whereby the forward end of the frame will be supported from the tractor and when the fittings on both sides of the tractor are in position, sideward movement of the frame will be prevented, although, actually the fittings are not secured to the tractor frame but are simply received in openings formed therein.

Still a further object is to provide a vertically arranged frame at the forward end of the U-shaped frame which frame is connected to the U-frame by the same fastening devices that connect the U-shaped frame to the fitting member at the forward end of the tractor.

Still another object is to provide a saddle adapted to be secured to the engine of the tractor and to extend from side to side and be secured to the U-shaped frame of the attachment, the saddle having recessed guides for receiving the sides of the U-shaped frame.

Still another object is to provide a pivoted boom or lifting arms mounted on the U-shaped frame, the pivotal connection for the boom serving as a means for connecting the U-shaped frame to the sides of the saddle.

Still another object is to provide hoisting mechanism mounted upon the saddle and forming a part thereof, operatively connected with cables whereby the boom may be swung on its pivotal connections.

Still another object is to connect the saddle to the engine of the tractor and to the sides of the U-shaped frame midway between their front and rear ends and to connect the boom to the frame and to the saddle whereby a maximum load may be elevated or carried by the boom without lifting or overbalancing the tractor itself.

With these and other objects in view, my invention consists in the construction, arrangement and combination of the various parts of my loader attachment for tractors, whereby the objects contemplated are attained, as hereinafter more fully set forth, pointed out in my claims, and illustrated in the accompanying drawings, in which:

Figure 1, is a top plan view of my loader attachment for tractors.

Figure 2, is a side view taken on line 2—2 of Figure 1, with parts of the tractor removed to better illustrate the construction.

Figure 3, is a detail sectional view taken on line 3—3 of Figure 2, showing the fitting connection between the frame and the radiator of the tractor.

Figure 4, is a horizontal sectional view taken on line 4—4 of Figure 3.

Figure 5, is a sectional view taken on line 5—5 of Figure 1, showing the saddle connection for the frame and parts of the hoisting mechanism.

Figure 6, is a front view of the vertical frame forming a part of the loader attachment.

Figure 7, is a top plan view of the saddle and hoisting mechanism; and

Figure 8, is a sectional view taken on line 8—8 of Figure 2 through the saddle and hoisting mechanism illustrating the connection thereof with the engine of the tractor.

In the accompanying drawings I have used the reference numeral 10 to indicate generally the main frame of a McCormick-Deering type of tractor. The frame 10 is of the one piece type and includes the rear axle housing 11 receiving an axle 12 therein upon which is mounted traction wheels 13.

Steerable wheels 14 are provided for the tractor and the axle for the steerable wheels 14 is connected to the main frame and braced relative thereto by the radius rod 15.

The tractor further includes a pair of fenders 16 for the traction wheels 13. A platform 17 extends over the rear end of the tractor or main frame thereof and between the fenders 16. The platform 17 permits the operator of the tractor to position himself for operating the tractor.

A driver's seat 18 and a steering wheel 19 form part of the tractor structure.

The main frame 10 is cast as a one piece unit and includes the differential housing, the transmission housing and the rest of the operative parts which go to make up a tractor.

The engine 20 is mounted upon and forms a part of the frame 10. A gas tank 21 is connected to a part of the engine 20 and is supported at one end by a pair of supporting legs 22 which are connected together at their lower ends and bolted to the frame 10 by the bolts 23.

The tractor further includes a gear shift lever 24, a pulley clutch lever 26 for operating the power takeoff pulley shaft of the engine.

The parts just described are of the ordinary construction of the McCormick-Deering type of tractor and it is with these parts that my attachment associates itself.

The tractor includes an ordinary radiator 27 mounted upon a radiator frame 28 which in turn is positioned upon and secured to the main frame 10 by bolts or the like 29. On each side of the frame 28 where the bolts 29 are positioned, is provided a recess or cut-away portion 30. The cut-away portion 30 is normally provided so that the bolts 29 may be used for connecting the frame 28 to the main frame 10 and I take advantage of the recess or cut-away portion 30 for securing the forward end of my loader frame to the tractor as I will hereinafter more fully describe.

My loader attachment includes a U-shaped main or horizontal frame A. The frame A has its two side bars 31 received on the opposite sides of the main frame 10 of the tractor.

The rear or free ends of the side bars 31 have connected thereto bearings 32 which extend around and are fastened to the rear axle housing 11. The two side bars are, of course, connected together at their forward ends by a front cross bar 33.

The frame A is actually formed of a single piece of bar iron bent substantially U-shaped so as to form the two side bars 31 and the cross bar 33. The forward ends of the side bars 31 and of the frame A are supported from the tractor by fittings B which rest against the frame of the tractor.

The movement which I have just described for the U-shaped frame is an important one in that when a forward pushing movement is applied to the frame, the tractor engages the cross bar 33 and exerts its pressure at the logical point of the frame.

When the tractor is moved rearwardly and the load carried by the attachment frame is pulled rearwardly, then the point of connection which serves efficiently is the connection between the rearward end of the frame and the axle of the tractor.

Each fitting B includes a supporting flange 34 which is bifurcated so as to form a pair of spaced fingers 35 which project into the recess 30 in the radiator frame 28 and straddle the head of each bolt 29. The fingers 35 of the supporting flange 34 actually rest upon the radiator frame 28 and are of the same size as the cutaway portion 30 and are received snugly therein.

Each fitting B further includes a downwardly extending side 36 which rests against a portion of the radiator frame 28 and against the main frame 10. The lower or free end of the side 36 includes a horizontal supporting flange 37 which in turn has an upwardly extending plate 38.

The plate 38 is spaced inwardly from the end of the flange 37 thereby defining a supporting shoulder 39. The plate 38 is spaced from the side 36 of the fitting B and this defines an opening 40.

The plate 38 is of substantially the same height as the width of the side bars 31 and the side bars 31 rest upon the supporting shoulder 39 and are secured to the plate 38 by fastening devices or bolts 41.

The opening 40 permits the nut of each bolt to be received therein. The U-shaped frame A is thus connected to a fitting B on each side of the radiator frame 28 and when the two fittings B are in position and secured to the side bars 31 of the frame A, then the entire frame A is positioned on the tractor.

The U-shaped frame itself keeps the fittings B within the recesses 30. A vertical or upright frame C is connected to the forward end of the frame A. The frame C includes a pair of angle bars 42 which have one of their flanges resting against the side bars 31 and the other of their flanges resting against the cross bars 33 of the frame A as clearly illustrated in Figure 4 of the drawings.

The frame C is clearly illustrated in Figure 6 of the drawings and includes a number of cross bars 43 which are positioned just forwardly of the radiator 27 of the tractor.

The two angle bars 42 may be further braced by X brace bars 44. The main frame 10 of the tractor includes a forwardly extending lug 45 and I connect the lower end of the frame C to the lug 45 by employing an angle bar 46 which has its ends slightly bent and fastened to the bars 42.

A bolt 47 connects the bar 46 to the lug 45. The frame C is connected to the frame A by the fastening devices or bolts 41 and in fact the bolts 41 also connect the frame C to the fittings B.

From the construction of the parts just described, it will be noted that the side bars 31 are interposed between the plates 38 of the fittings B and between the side bars 42 of the frame C and that these three parts, the plate 38, the side bar 31 and the bar 42 are all connected together by the bolt 41.

The position of the fittings B relative to the side bars 31 and frame C are clearly illustrated in Figure 6 of the drawings. The upper end of the frame C is braced relative to the frame A by inclined brace rods or bars 48.

Mounted upon the upper ends of the bars 42 of the frame C are bearings 49 having a shaft 50 journaled therein with its ends projecting out beyond the bars 42. Upon each of the projected ends of the shaft 50 is mounted a pair of pulleys 51 and 52.

A boom frame D is pivotally mounted upon the frame A. The boom frame D includes a pair of lifting arms 53 which are channel shaped in cross section. The lifting arms 53 may be reinforced by angle irons 54 and iron pieces 55. The iron pieces 55 are positioned within the channels of the lifting arms 53 and riveted or otherwise secured thereto.

Inclined angle iron stops 56 are mounted upon the bars 42 of the frame C, against which the lifting arms of the boom D strike for limiting the upward or pivotal movement of the boom D.

The forward free ends of the lifting arms 53 of the boom D are inclined towards each other and connected together by a plate 56ª. The iron pieces 55 which are mounted in the channel lifting arms 53 project out beyond the forward ends thereof and are riveted or otherwise secured together for forming a bearing for the swivel hook pin 57. Mounted upon the pin 57 is a swivel hook 58.

Secured to the lifting arms 53 upon their inclined portions 59 are the bearings 60. The bearings 60 are in register with each other and form such bearings as will permit the pulley shaft 61 to be mounted therein. The bearings 60 are inclined downwardly and outwardly a short distance so that the shaft 61 may pass from one bearing to the other just below the lifting arms 53 as clearly illustrated in Figure 2 of the drawings.

The shaft 61 projects out beyond the bearings 60 and upon these projected ends I mount pulleys 62.

In order to provide a second swivel hook upon the boom D located closer to the frame C, in order to lift a heavier load, I mount a cross shaft 63 upon the lifting arms 53 and connect them thereto by U-shaped bolts 64.

A swivel hook 65 is connected to the cross shaft 63 and positioned centrally between the two lifting arms 53. A brace 66 extends between the two lifting arms 53 adjacent the cross shaft 63.

While I have described certain embodiments of construction for the outer end of the boom D it will be noted that various methods of reinforcing and bracing the outer end of the boom frame D may be employed.

The rear or lower ends of the lifting arms 53 have castings 67 secured thereto provided with openings 68 through which are extended pivot bolts 69 for pivotally mounting the boom D.

The frame 10 of the tractor includes a fly wheel casing 70 ordinarily covered by a cover plate or cap. I employ a saddle for supporting the hoisting mechanism and for connecting the U-frame A thereto and I place this saddle which I will refer to by the reference E, upon the frame 10 and over the fly wheel casing 70.

The saddle E includes a casting which serves as a cover 71 for the casing 70. The cover 71 is bowed between its ends and formed with a pair of flat portions 72 through which are extended cap screws 73. The cap screws 73 project into the frame 10 of the fly wheel casing 70 and hold the entire saddle E in position upon the frame 10 and over the casing 70.

The cover 71 is formed with a notch 74 which encircles an oil pipe 75 ordinarily provided upon the tractor. The cover 71 may be ribbed for reinforcing purposes.

A pair of downwardly projecting arms 76 form a part of the saddle E and extend along the sides of the frame 10 or the fly wheel casing 70.

A pair of end bearing members 77 are secured to the arms 76 by means of the cap screws or the like 78. The end bearing members 77 are recessed so that the shoulder 79 rests upon the arm 76 and the arm 76 is partly received within the end bearing members 77 as clearly shown in Figure 8 of the drawings.

Directly above the cover 71 and within the members 77 is mounted a drum shaft 80. The drum shaft 80 is journaled in bearing openings 81 formed in the end bearing members 77.

The ends of the drum shaft 80 project out beyond the end bearing members 77 and have fixed thereto cable drums 82. A sprocket wheel 83 is fixed to the drum shaft 80 between the bearings 81.

The end bearing members 77 are further connected to the arms 76 by the pivot bolts 69. Each of the pivot bolts 69 is formed with an enlarged portion 84 of substantially the same diameter as the opening 68 in the members 67.

The end bearings 77 have grooves 85 formed therein adapted to receive the side bars 31. The pivot bolts 69 have contracted spindles 86 which project through openings formed in the end bearing members 77 and into the arms 76.

The ends of the spindles 86 are screw threaded and coact with screw threaded openings formed in the arms 76.

When the pivot bolts 69 are tightened they cause the side bars 31 to fit tight against the bearing members 77 and also hold the arms 76 to the bearing members 77.

The length of the enlarged portion 84 of the pivot bolts 69 is a fraction greater than the width of the castings 67 and this permits the castings 67 at the lower ends of the boom D to be free to pivot while the other parts are held in position by the pivot bolts 69.

The pivot bolts 69 are formed with enlarged heads which may have flattened sides whereby a wrench may be engaged for screwing the pivot bolts 69 in position.

I will now describe the hoisting mechanism and power take-off from the tractor.

The end bearing members 77 include a pair of bearings 87. In one of the bearings 87 is mounted the clutch shaft 88 and in the other of the bearings 87 is mounted the brake shaft 89.

The brake shaft and clutch shaft are operatively connected together by means of a clutch mechanism F. The clutch mechanism F includes a clutch housing 90 fixed to the shaft 88.

A clutch element 91 is adapted to coact with the clutch housing 90. Mounted upon the shaft 89 is a clutch control collar 92. The collar 92 is slidably mounted upon the shaft but nonrotatably.

Sliding of the collar 92 on the shaft 89 causes its inclined surface 93 to coact with the pivoted arms 94 causing them to spread and force the clutch element 91 into engagement with the clutch housing 90 for operatively connecting the shaft 88 with the shaft 89.

Mounted within a groove formed in the collar 90 is a ring 95 having a pin 96 thereon for receiving the bifurcated end of the bell crank lever 97. The bell crank lever 97 is pivoted upon one of the bolts 23 ordinarily provided for fastening the gas tank support 22 to the frame 10.

Mounted upon the shaft 89 is a sprocket gear 98 operatively connected to the sprocket 83 on the shaft 80 by a chain 99.

The tractor includes a pulley drive shaft 100 upon which I mount a sprocket wheel 101. Upon the shaft 88 just outside of the end bearing 77 I mount a sprocket wheel 102 in alignment with the sprocket wheel 101 and adapted to be connected thereto by a sprocket chain 103.

From the construction of the parts just described it will be seen that power from the engine of the tractor may be transmitted through the sprocket wheel 101 to the shaft 88.

Power from the shaft 88 may be transmitted to the shaft 99 by placing the clutch F in operative position and thereafter power from the shaft 89 may be transmitted to the drum shaft 80.

In order to control the operation of the clutch F from the driver's seat I mount a control lever 104 upon the platform 17.

The lever 104 is adjacent the driver's seat 18. The lever 104 has pivotally connected to it a link 105. The link 105 is in turn connected at its forward end to a pivoted lever 106. The lever 106 is pivoted upon a bolt 107 ordinarily provided for holding the frame cover plate of the tractor in position.

The free end of the lever 106 is in turn connected to the free end of the bell crank lever 97 by a short link 108. From the construction of the parts just described it will be seen that moving the lever 104 forwardly or rearwardly will impart a sliding movement to the collar 92 which will cause the clutch F to either be engaged or disengaged.

The shaft 89 has a brake drum 109 secured thereto. The brake drum 109 on the shaft 89 is controlled from a position adjacent the driver's seat by a foot brake control 110.

Upon the supporting platform 17 I mount a bracket 111 having a lever 112 pivotally connected thereto. The brake control 110 includes a foot piece and a ratchet bar 113.

The ratchet bar forms a part of the foot piece and is pivoted to the lever 112 by the pivot 114. A coil spring 115 tends to pull the lever 112 in a rearward direction.

The free end of the coil spring 115 is fixed to the bracket 111. The ratchet bar 113 coacts with a keeper 116 mounted upon the frame 10 of the tractor. The spring 115 tends to hold the ratchet bar 113 in engagement with the keeper 116 preventing the spring 115 from pulling the lever 112 rearwardly, although, when the foot of the operator engages the foot piece of the member 110, it permits the ratchet bar 113 to ratchet through the keeper 116 against the action of the spring 115.

A brake band 117 extends around the brake drum 109 and secured to one end of the brake band is a lever 118. The lever 118 is pivoted upon a bracket 119 mounted upon the tractor.

The free end of the brake band 117 is connected to the lever 118 by an adjustable rod 120. The lever 118 is in turn connected to the brake lever 112 by a link 121.

When the brake lever 112 is moved forwardly it causes the brake band 117 to tighten around the brake drum 109 and when the brake lever is permitted to move rearwardly then the brake band 117 is loose upon the brake drum 109.

The ratchet bar 113 and keeper 116 permit the brake to be operated and locked in any of its braking positions.

A sheet metal covering 122 extends from one end bearing 77 to the other and serves as a covering for the entire saddle mechanism and hoisting mechanism.

Fixed to each of the cable drums 82 is a cable 123. Each cable 123 is fastened to the side flanges of the drums 82 and extend first over the pulleys 51 on the shaft 50 and then around the pulley wheels 62 and then around the outer pulley wheels 52 upon the shaft 50 and finally fastened to the bearings 60 upon the forward end of the boom frame D.

From the description of the cable 123 it will be noted that rotation of the drums 82 will cause the cables 123 to wind thereon which in turn will cause the boom frame D to swing upon its pivots for moving it to a raised or elevated position.

The boom D may be raised or lowered by controlling the pulley drive shaft 100 and the hoisting mechanism which I have just described. The boom may be raised and then locked in its raised position by controlling the brake shaft 89 by means of the foot brake 110.

Any load that may be raised may be lowered gently by controlling the brake shaft 89. It will be noted that my entire loader attachment is mounted upon the tractor without the necessity of revising or modifying any of the parts of the tractor itself and that I connect my frame to the rear end of the tractor, to the front end of the tractor and to the tractor engine substantially midway between the front and rear ends.

One of the advantages of my attachment resides in the saddle connection which rests upon the engine and connects the two side bars of the U-frame between the ends to the main frame proper of the tractor and at the same time serves as a means of connecting the entire hoisting mechanism and power take-off to the loader attachment.

Another advantage of my attachment lies in the arrangement of the power take-off and hoisting mechanism wherein the entire mechanism is mounted forwardly of the driver's seat and between the sides of the U-frame so that practically none of the mechanism of my attachment interferes with the ordinary use of the tractor itself.

Some changes may be made in the arrangement and construction of the parts of my invention, without departing from the real spirit and purpose of my invention, and it is my intention to cover by my claims, any modified forms of structure or use of mechanical equivalents, which may be reasonably included within their scope.

I claim as my invention:

1. In combination with a tractor having a driving engine thereon, a U-shaped main frame having its side bars positioned along the sides of the tractor and having its connecting member positioned along the front of the tractor and having the free ends of said side bars secured to the tractor and a fitting mounted upon each side of the tractor near the forward end thereof and having portions received in recesses formed in the tractor and portions secured to said side bars.

2. In combination with a tractor having a driving engine thereon, a U-shaped main frame having its side bars positioned along the sides of the tractor and having its connecting member positioned along the front of the tractor, the free ends of said side bars being secured to the rear axle of the tractor and a fitting mounted upon each side of the tractor near the forward end thereof adapted to be secured to the forward ends of the side bars of the main frame, said fittings adapted to extend into recesses formed in the tractor and a vertical frame mounted upon the side bars of the U-frame at the forward end thereof.

3. In combination with a tractor having a driving engine thereon, a U-shaped main frame having its side bars positioned along the sides of the tractor and having its connecting member positioned along the front of the tractor and resting thereagainst, the free ends of said side bars being secured to the rear axle of the tractor and a fitting mounted upon each side of the tractor near the forward end thereof adapted to engage and support the forward ends of the side bars of the main frame and a vertical frame mounted upon said frame at the forward end thereof and common means for fastening each side bar to the vertical frame and to said fittings.

4. In combination with a tractor having driving engine thereon, a U-shaped main frame having its side bars positioned along the sides of the tractor and having its connecting member positioned along the front of the tractor and resting thereagainst, the free ends of said side bars being secured to the rear axle of the tractor and a fitting mounted upon each side of the tractor near the forward end thereof adapted to engage and support the forward ends of the side bars of the main frame, said fittings adapted to extend into recesses formed in the tractor.

5. In combination with a tractor having a driving engine thereon, a U-shaped main frame having its side bars positioned along the sides of the tractor and having its connecting member positioned along the front of the tractor, the free ends of said side bars being secured to the tractor, fittings secured to the forward end of said frame and adapted to rest upon shoulders formed by recesses in the tractor for supporting the forward end of said frame and a saddle mounted upon said tractor having downwardly extending parts adapted to be secured to the side bars of the main frame.

6. In combination with a tractor having a driving engine thereon, a U-shaped main frame having its side bars positioned along the sides of the tractor and having its connecting member positioned along the front of the tractor and resting thereagainst, the free ends of said side bars being secured to the rear axle of the tractor, fittings secured to the forward end of said frame and adapted to rest upon the tractor for supporting the forward end of said frame and a saddle mounted upon said tractor having downwardly extending parts formed with recesses for receiving the side bars of the main frame.

7. In combination with a tractor having a driving engine thereon, a U-shaped main frame having its side bars positioned along the sides of the tractor and having its connecting member positioned along the front of the tractor and resting thereagainst, the free ends of said side bars being secured to the rear axle of the tractor, fittings secured to the forward end of said frame and adapted to rest upon the tractor for supporting the forward end of said frame and a saddle mounted upon said tractor having downwardly extending parts formed with recesses for receiving the side bars of the main frame, a boom, means for pivoting said boom upon said frame, said means serving to connect the side bars of the main frame with the saddle.

8. In combination with a tractor having a driving engine thereon, a U-shaped frame having its side bars positioned along the sides of the tractor and having its connecting member positioned along the front of the tractor and resting thereagainst, the free ends of said side bars being secured to the rear axle of the tractor, fittings secured to the forward end of said frame and adapted to rest upon the tractor for supporting the forward end of said frame and a saddle mounted upon said tractor, a boom, means for pivotally mounting said boom upon said frame, said means serving to connect said saddle, said frame and said boom together.

9. In combination with a tractor having a driving engine thereon, a main frame having side bars positioned along the sides of the tractor and having a connecting bar secured to the forward ends of the side bars and resting against the front of the tractor, means for supporting the forward ends of the side bars from the tractor, means for connecting the rear ends of the side bars to the axle of the tractor and a saddle positioned upon the tractor rearwardly of the driving engine having parts adapted to receive portions of the side bars and be secured thereto.

10. In combination with a tractor having a driving engine thereon, a main frame having side bars positioned along the sides of the tractor and having a connecting bar secured to the forward ends of the side bars and resting against the front of the tractor, means for supporting the forward ends of the side bars from the tractor, means for connecting the rear ends of the side bars to the axle of the tractor and a saddle positioned upon the tractor rearwardly of the driving engine having downwardly projecting arms provided with recesses for receiving portions of the side bars within the recesses.

11. In combination with a tractor having a driving engine thereon, a main frame having side bars mounted at their rear and forward ends upon said tractor and a saddle resting upon the tractor rearwardly of the driving engine and having parts adapted to engage portions of the side bars and be secured thereto whereby the frame is supported between its forward and rear ends upon the tractor by said saddle and said side bars are braced between their ends against movement towards each other and a boom pivotally connected to the side members at a point where the strain of the boom on the side bars will be transmitted to the saddle.

12. In combination with a tractor having a driving engine thereon, a main frame mounted at its rear and forward ends upon said tractor and a saddle resting upon the tractor rearwardly of the driving engine and having parts adapted to engage portions of the main frame and be secured thereto whereby the frame is supported between its forward and rear ends upon the tractor by said saddle, a boom, means for pivotally mounting said boom on said frame, said means serving to connect said frame with said saddle.

13. In combination with a tractor having a driving engine thereon, a main frame having side bars mounted at their rear and forward ends upon said tractor and a saddle resting upon the tractor rearwardly of the driving engine and having parts adapted to engage portions of the side bars and be secured thereto whereby the frame is supported between its forward and rear ends upon the tractor by said saddle and said side bars are braced between their ends against movement towards each other and a boom pivotally connected to the side members at a point where the strain of the boom on the side bars will be transmitted to the saddle, said main frame having a cross bar adapted to extend in front of the tractor and be secured to said side bars.

14. In combination with a tractor having a driving engine thereon, a main frame mounted at its rear and forward ends upon said tractor and a saddle resting upon the tractor rearwardly of the driving engine and having parts adapted to be positioned adjacent the main frame and means of connection therebetween whereby the frame is supported between its forward and rear ends upon the tractor by said saddle, a boom, means for pivotally mounting said boom on said frame at a point where the strain of said boom will be transmitted to the connection between the frame and the saddle.

15. In combination with a tractor having a driving engine thereon, a main frame mounted at its rear and forward ends upon said tractor and a saddle resting upon the tractor rearwardly of the driving engine and having parts adapted to engage portions of the main frame and be secured thereto whereby the frame is supported between its forward and rear ends upon the tractor by said saddle, a boom, means for pivotally mounting said boom on said frame, at a point where the strain of said boom on the frame will be directly transmitted to said saddle, a hoisting mechanism upon said saddle, means for operatively connecting said hoisting mechanism with the driving engine of said tractor and cables for connecting said hoisting mechanism with said boom.

16. In combination with a tractor having a driving engine thereon, a U-shaped main frame having its side bars positioned along the sides of the tractor and having its connecting member positioned along the front of the tractor and resting thereagainst, the free ends of said side bars being secured to the rear axle of the tractor and fittings supported upon said tractor and adapted to support the forward ends of said side bars, said fittings including a horizontal flange upon which the side bars of the main frame rest.

17. In combination with a tractor, a main frame, means for supporting the forward end of the main frame upon the tractor, said means including fittings each having a supporting flange adapted to be received in recesses formed in the tractor and having a horizontal flange adapted to have the frame rest thereon and means for connecting the frame to the fittings, said fittings being held in position upon the tractor by said frame.

18. In combination with a tractor having a driving engine thereon, a U-shaped main frame having its side bars positioned along the sides of the tractor and having its connecting member positioned along the front of the tractor and resting thereagainst, the free ends of said side bars being secured to the rear axle of the tractor, fittings secured to the forward end of said frame and adapted to rest upon the tractor for supporting the forward end of said frame and a saddle mounted upon said tractor having downwardly extending parts formed with recesses for receiving the side bars of the main frame, a boom, means for pivoting said boom upon said frame, said means comprising a bolt, a head thereon, an enlarged portion terminating in a shoulder for engaging the side bars of the main frame and a portion threaded into said saddle.

19. In combination with a tractor having a driving engine thereon, a main frame mounted at its rear and forward ends upon said tractor and a saddle resting upon the tractor rearwardly of the driving engine and having parts adapted to engage portions of the main frame and be secured thereto by means of shouldered bolts, whereby the frame is supported between its forward and rear ends upon the tractor by said saddle, enlarged portions of said bolts beyond the shoulders thereof forming a pivotal connection for a crane boom.

20. In combination with a tractor having a driving engine thereon, a U-shaped main frame having its side bars positioned along the sides of the tractor and having its connecting member positioned along the front of the tractor and resting thereagainst, the free ends of said side bars being secured to the rear axle of the tractor, fittings secured to the forward end of said frame and adapted to rest upon the tractor for supporting the forward end of said frame and a saddle mounted upon said tractor having downwardly extending parts adapted to be secured to the side bars of the main frame by means of shouldered bolts having the shoulders thereof engaging said side bars, a crane boom pivoted on said main frame, the enlarged portions of said bolts beyond the shoulders thereof providing pivots for said boom, a hoisting mechanism mounted on said saddle operable from said engine and having operative connection with said boom for causing its pivotal movement on said bolts.

21. In combination with a tractor having a driving engine thereon, a U-shaped frame having its side bars positioned along the sides of the tractor and having its connecting member positioned along the front of the tractor and resting thereagainst, the free ends of said side bars being secured to the rear axle of the tractor and a fitting mounted upon each side of the tractor near the forward end thereof adapted to engage and support the forward ends of the side bars of the main frame and a vertical frame mounted upon said frame at the forward end thereof and a common means for fastening each side bar to the vertical frame and to said fittings, a saddle secured to the fly wheel casing of said engine and having recesses for receiving the side bars of said main frame, bolts for securing said side bars in said recesses, a boom pivotally mounted on said bolts, a hoisting mechanism on said saddle and cables extending therefrom over the upper end of said vertical frame and connected to said boom whereby said hoisting mechanism may impart pivotal movement to said boom.

22. In combination with the tractor, a frame, means for supporting the forward end of the frame upon the tractor, said means including fittings each having a supporting flange adapted to be supported upon said tractor and having a flange adapted to have the frame rest thereagainst and means for connecting the frame to the fittings, said fittings being held in position upon the tractor by said frame.

Des Moines, Iowa, April 29, 1926.

SIGURD E. ANDERSON.